US007654895B2

(12) United States Patent
Pacey

(10) Patent No.: US 7,654,895 B2

(45) Date of Patent: Feb. 2, 2010

(54) GAMING MACHINE WITH EXPANDABLE ARRAY

(75) Inventor: Larry J. Pacey, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 560 days.

(21) Appl. No.: 10/759,619

(22) Filed: Jan. 16, 2004

(65) Prior Publication Data

US 2005/0159208 A1 Jul. 21, 2005

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ............................ 463/16; 463/20; 463/21; 463/25; 463/29; 273/142 R; 273/143 R

(58) Field of Classification Search .................. 463/16, 463/20, 21, 25, 29; 273/142 R, 143 R
See application file for complete search history.

(56) References Cited

U.S. PATENT DOCUMENTS

| | | | | |
|---|---|---|---|---|
| 4,198,052 A | | 4/1980 | Gauselmann | 273/143 |
| 5,152,529 A | | 10/1992 | Okada | 273/143 R |
| 5,205,555 A | | 4/1993 | Hamano | 273/143 R |
| 5,704,835 A | * | 1/1998 | Dietz, II | 463/20 |
| 5,722,891 A | | 3/1998 | Inoue | 463/20 |
| 5,823,874 A | | 10/1998 | Adams | 463/17 |
| 5,848,932 A | | 12/1998 | Adams | 273/143 |
| 5,882,261 A | * | 3/1999 | Adams | 463/20 |
| 5,984,782 A | | 11/1999 | Inoue | 463/20 |
| 6,186,894 B1 | | 2/2001 | Mayeroff | 463/20 |
| 6,203,429 B1 | | 3/2001 | Demar et al. | 463/20 |
| 6,227,971 B1 | * | 5/2001 | Weiss | 463/20 |
| 6,251,013 B1 | | 6/2001 | Bennett | 463/13 |

(Continued)

FOREIGN PATENT DOCUMENTS

GB 2 097 160 A 10/1982

(Continued)

OTHER PUBLICATIONS

"Arrow Line" by Bally, 1971 (appearing in Bally Slot Machines, Revised 3rd Edition, Liberty Belle Books, by Marshall Fey, p. 17).

(Continued)

*Primary Examiner*—John M Hotaling, II
*Assistant Examiner*—Adetokunbo Torimiro
(74) *Attorney, Agent, or Firm*—Nixon Peabody LLP

(57) ABSTRACT

A slot-type gaming machine using an expandable symbol array to create a series of sequentially larger symbol arrays with the potential for additional or enhanced awards. The generation of the larger arrays can be performed through a variety a different mechanisms, such as the addition of a reel to the base array. The secondary arrays may be generated only under specific sets of circumstances that occur in the base array including, a winning pay line, the occurrence of a bonus triggering symbol, etc. To increase player interest in the game, some embodiments include allowing the player to determine where the additional symbols to create the larger array are placed in the base array.

35 Claims, 16 Drawing Sheets

U.S. PATENT DOCUMENTS

| | | | | |
|---|---|---|---|---|
| 6,394,902 | B1 | 5/2002 | Glavich et al. | 463/20 |
| 6,517,432 | B1 * | 2/2003 | Jaffe | 463/16 |
| 6,544,120 | B2 * | 4/2003 | Ainsworth | 463/20 |
| 6,565,433 | B1 | 5/2003 | Baerlocher et al. | 463/20 |
| 6,605,000 | B2 | 8/2003 | Adams | 463/20 |
| 6,634,945 | B2 | 10/2003 | Glavich et al. | 463/25 |
| 6,641,477 | B1 | 11/2003 | Dietz, II | 463/20 |
| 6,749,504 | B2 * | 6/2004 | Hughs-Baird | 463/20 |
| 2002/0010017 | A1 | 1/2002 | Bennett | 463/20 |
| 2002/0055382 | A1 * | 5/2002 | Meyer | 463/20 |
| 2002/0068623 | A1 | 6/2002 | Gauselmann | 463/20 |
| 2003/0022713 | A1 | 1/2003 | Jasper et al. | 463/20 |
| 2003/0054872 | A1 * | 3/2003 | Locke et al. | 463/20 |
| 2003/0064779 | A1 | 4/2003 | Suda | 463/20 |
| 2003/0064796 | A1 | 4/2003 | Glavich et al. | 463/25 |
| 2003/0069062 | A1 | 4/2003 | Shimizu | 463/20 |
| 2003/0216165 | A1 * | 11/2003 | Singer et al. | 463/20 |
| 2005/0026673 | A1 * | 2/2005 | Paulsen et al. | 463/16 |
| 2005/0130731 | A1 * | 6/2005 | Englman et al. | 463/20 |

FOREIGN PATENT DOCUMENTS

| | | | |
|---|---|---|---|
| GB | 2 117 155 | A | 10/1983 |
| GB | 2 117 952 | A | 10/1983 |
| GB | 2130413 | A | 5/1984 |
| WO | WO 97/27569 | | 7/1997 |

OTHER PUBLICATIONS

"Double or Nothing" by Bally Distributing Company, approx. 1975 (appearing in Lemons, Cherries, and Bell-Fruit-Gum, by Richard M. Bueschel, 1995, p. 267).

"Extra Line" by Bally, 1971 (appearing in Bally Slot Machines, Revised 3rd Edition, Liberty Belle Books, by Marshall Fey, p. 23).

"Fistful of Fives" by Jubilee, pre-1994—In the "Fistful of Fives" machine by Jubilee, a player is able to insert up to five coins to play up to five win lines on the three main reels. These three reels pay the amounts shown on the front of the machine for certain combinations. For instance, three 7's pays five coins. Spaced-apart from the three main reels are two bonus reels; one displays odds such as even, ten-to-one, six-to-one, five-to-one, etc., while the second bonus reel identifies a win-line of the main reels. When a player wins on the main reels, the winning amount is multiplied by the odds shown on the first bonus reel for the win line shown on the second bonus reel. Thus, for example, "7-7-7" on the main reels, and ten-to-one on the first bonus reel pays 50 coins, if the win lines having the 7-7-7 is show on the second bonus reel. Every spin of the main reels causes a simultaneous spin of the bonus reels. No additional coins are required to participate in the increased odds associated with the bonus reels.).

"Lucky Twins Continental" by Bally, 1972 (appearing in Bally Slot Machines, Revised 3rd Edition, Liberty Belle Books, by Marshall Fey, p. 26).

"Twin Lightning" by Bally, 1972 (appearing in Bally Slot Machines, Revised 3rd Edition, Liberty Belle Books, by Marshall Fey, p. 28).

* cited by examiner

GAMING MACHINE WITH EXPANDABLE ARRAY

FIELD OF THE INVENTION

The present invention is related to gaming machines and, more particularly, to slot-type gaming machines with bonus features.

BACKGROUND OF THE INVENTION

Gaming machines, such as slot machines, video poker machines and the like, are the cornerstone of the gaming industry. The commercial success of these gaming machines is as dependent on their entertainment value as their likelihood of providing a winning payout. To improve the entertainment value of their products, manufacturers have developed a variety of enhancements to the basic slot-type game. For example, gaming machine manufacturers have embellished their gaming machines with bonus games.

Bonus games typically start when a predetermined base game outcome occurs. Bonus games provide additional play features that embellish the play of the basic slot game. For example, some base games may trigger wild symbols that form additional winning pay lines. Still another bonus feature adds a surprise pay line to the array to provide players with another way of winning the game. All these features are designed to give the player a more entertaining gaming experience.

Although these bonus games and features have had varying degrees of success, players are always looking for new games and with new features. In the competitive gaming industry, there is a continuing need for slot machine manufacturers to produce new types of games that will attract players.

SUMMARY OF THE INVENTION

In the typical slot-type gaming machine, a wager is placed and a plurality of discrete symbols are displayed in an array. These symbols are displayed on a video display screen in the case of an electronic video gaming machine. In an electromechanical gaming machine, the symbols are displayed using mechanical reels. Winning combinations result when certain symbol combinations occur in specific geometric locations within the array. These geometric locations are denoted with a pay line that runs through the array in the potentially winning symbol locations. In order to be eligible for an award on a pay line, the player must place a wager on that pay line. Once that wager has been placed, that pay line is called an active pay line. The gaming machine evaluates the initial array formed by the base game for potentially winning outcomes and awards the player for a winning outcome on an active pay line.

To provide players with a new and more entertaining gaming machine, a new slot-type game is provided which uses an expanding game array to give players additional opportunities to obtain winning combinations. In accordance with the present invention, the player may be eligible to receive an additional reel that can be added to the base game array. This produces a larger secondary (or bonus) game array by converting, for example, a three by three array to a three by four array. If desired, more than one additional reel may be added simultaneously or sequentially to the base game array. The additional reel supplied to the player may consist of symbols taken from the same symbol set used to create the original base game array.

In the case of an electronic video gaming machine, the electronic reels forming the initial base game array are resized or repositioned to provide room for one or more additional reels on the video display. The additional reel is positioned in the array and electronically spun to produce a random outcome. This secondary array, formed from the base array and the added reel, is evaluated to determine if further winning symbol combinations have been formed.

The gaming machine may randomly determine the position of the additional reel in the base array. Alternately, the player may determine the position of the additional reel. The player may add the reel to the left or to the right of the base game array, or the player may insert the additional reel between the original base game reels. The player may be able to determine the best location for placing the additional reel, and consequently improve his odds of a winning outcome. The player's selection of the position of the added reel increases player interest and the entertainment value of the game.

BRIEF DESCRIPTION OF THE DRAWINGS

The foregoing and other advantages of the invention will become apparent upon reading the following detailed description and upon reference to the drawings in which.

Figure 1:
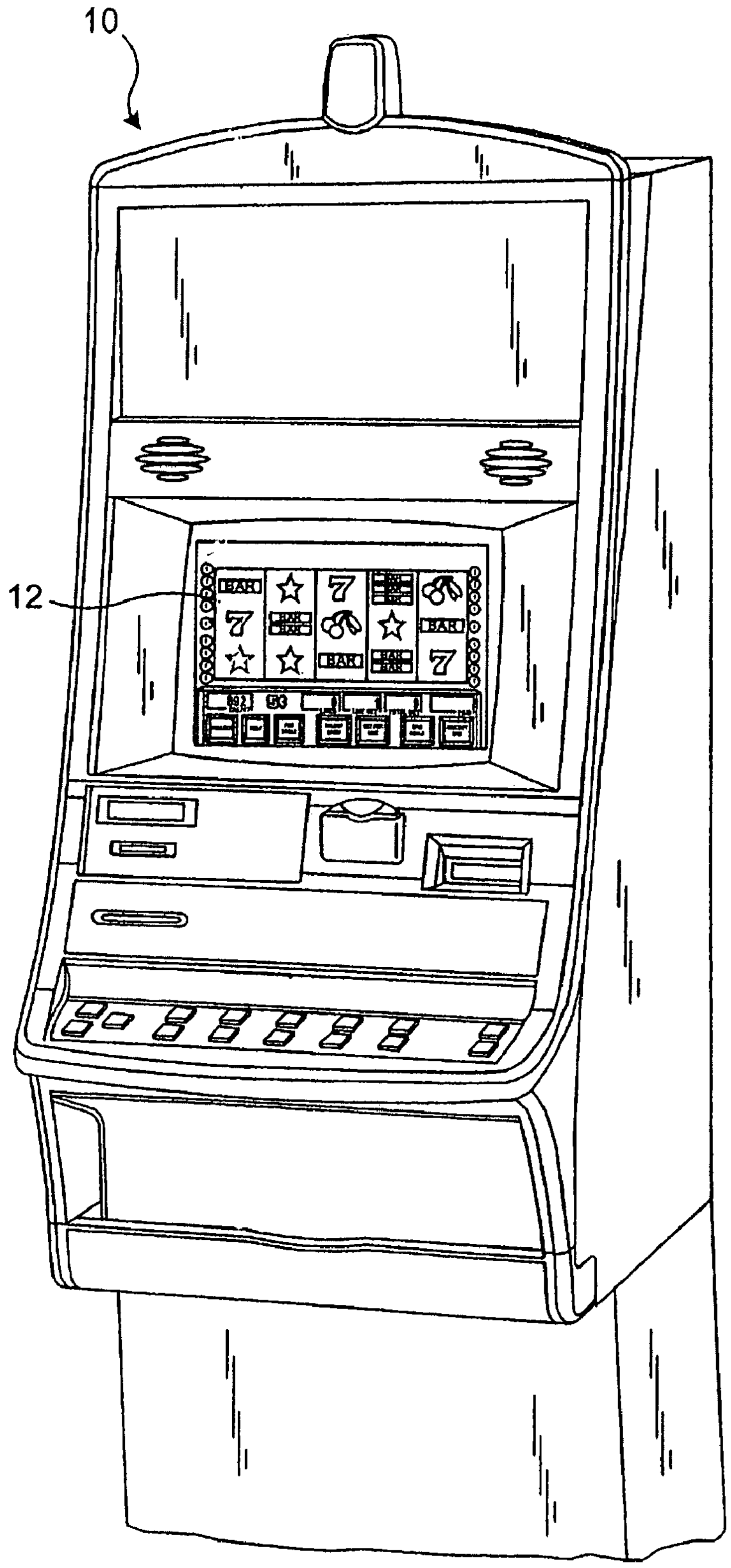
FIG. 1 is an isometric view of a video slot-type gaming machine embodying the present invention.

While the invention is susceptible to various modifications and alternative forms, specific embodiments have been shown by way of example in the drawings and will be described in detail herein. It should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, a video slot-type gaming machine 10 is shown operable to play a game of chance. The typical video slot machine has a base game with five simulated spinning reels that are randomly stopped to display a game outcome. The video display 12 may be in the form of a dot matrix, CRT, LED, LCD, electro-luminescent, or other type of video display known in the art. The video display 12 may include a touch sensitive screen that allows players to make game selections by touching the video display 12.

Figure 2:
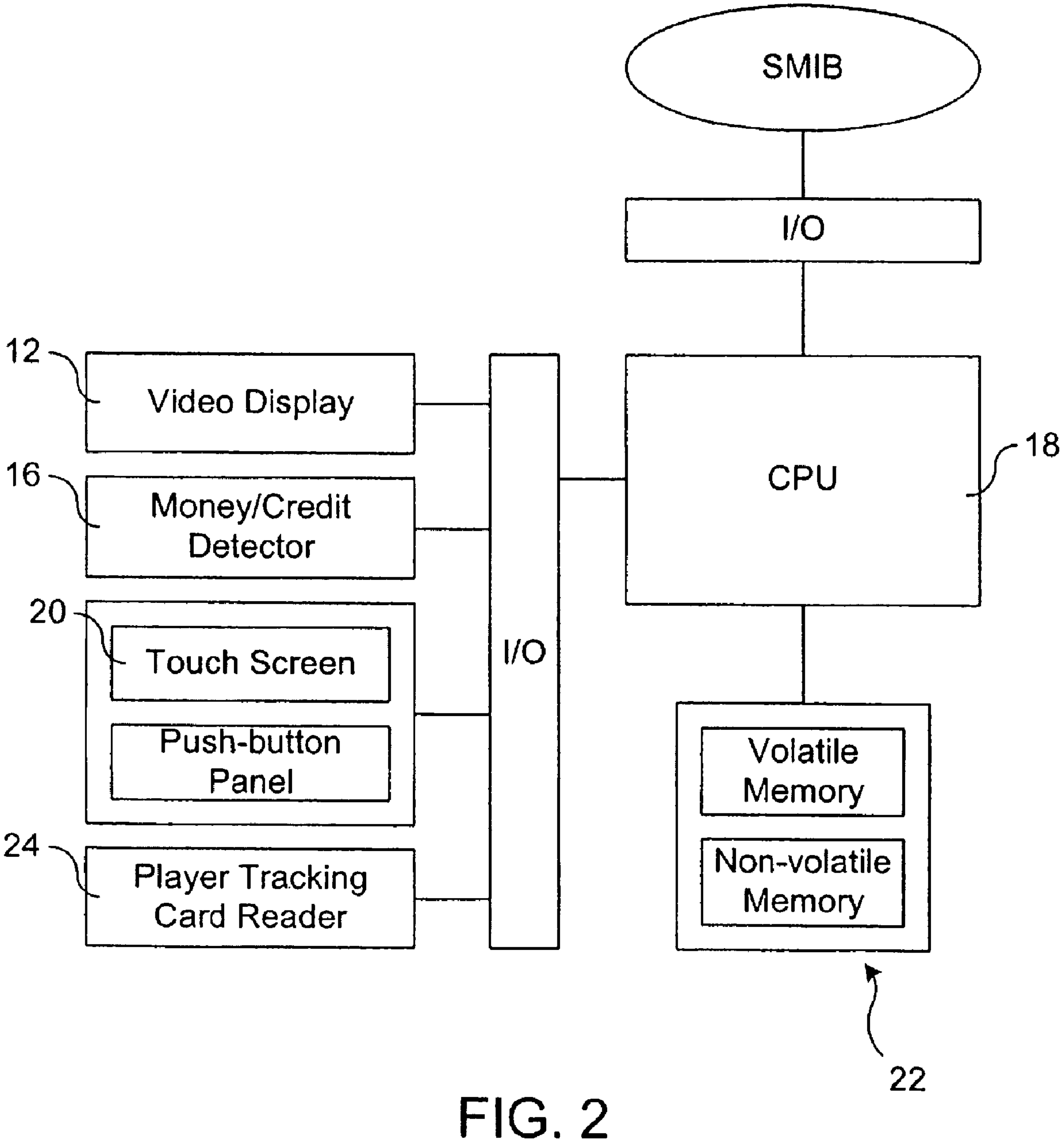
FIG. 2 is a block diagram of a control system suitable for operating a slot-type gaming machine.

FIG. 2 is a block diagram of a control system suitable for operating the slot machine 10 of FIG. 1. A system memory 22 stores control software, operational instructions and data associated with the gaming machine 10. In one embodiment, the system memory 22 comprises a separate read-only memory (ROM) and battery-backed random-access memory (RAM). The CPU 18 operates to execute the game program stored in system memory 22. The game program determines the game outcome, which is displayed on the video display 12 as simulated symbol-bearing reels.

Figure 3:
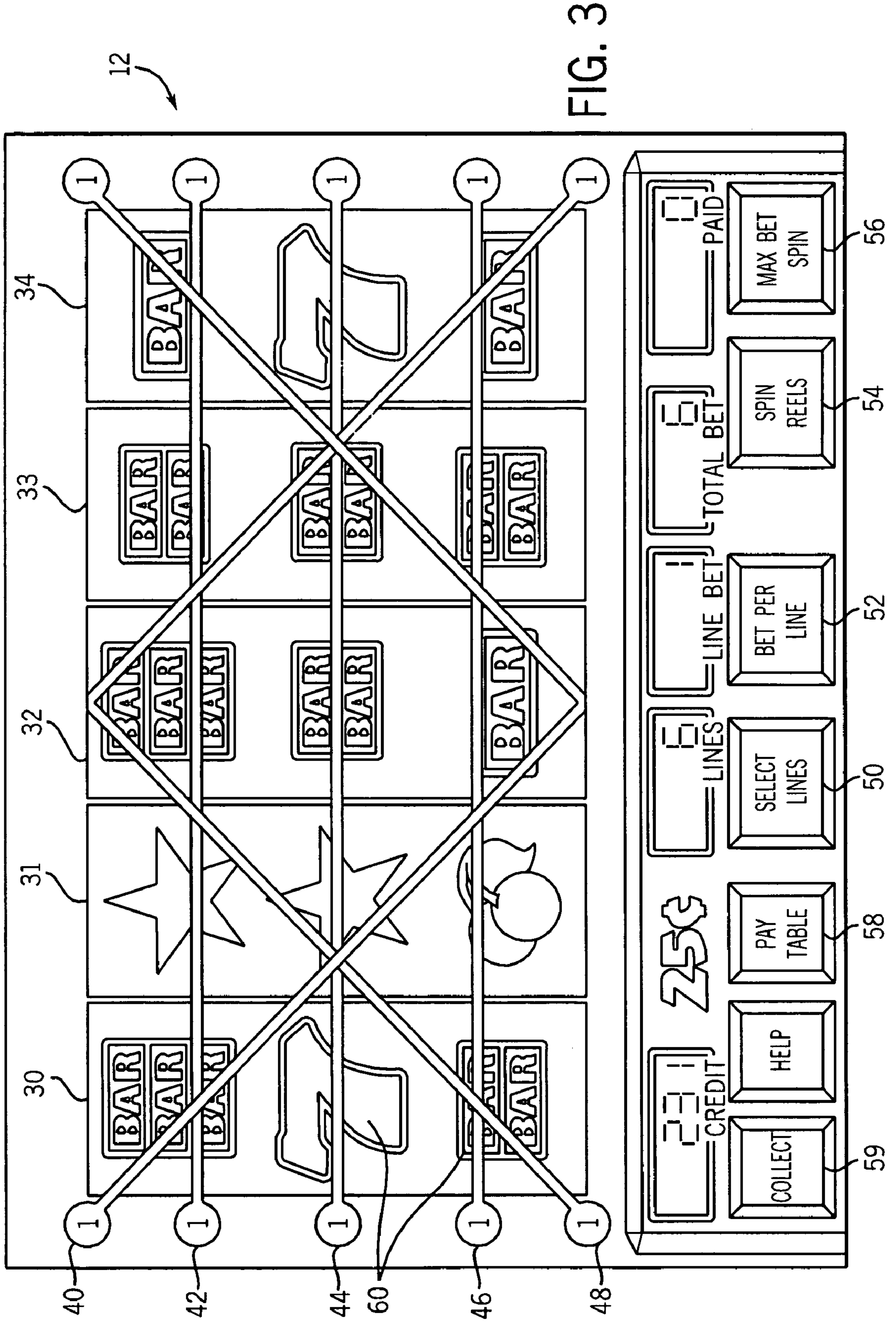
FIG. 3 is a game display from the slot machine of FIG. 1 displaying the available pay lines.

FIG. 3 shows a typical slot-type game, as it would appear on the video display 12 of gaming machine 10. The slot-type game depicted is a three by five array having spinning reels 30-34 with five pay lines 40, 42, 44, 46, and 48. Each reel bears a plurality of discrete symbols 60. The number of reels and the number of symbols on each reel determine the size of the array (a real symbol may also be a blank position on the reel). Each of the pay lines 40, 42, 44, 46, and 48 extend through one discrete symbol 60 on each of the five reels 30-34. The number and configuration of the pay lines may be varied from that shown.

Game play is initiated by placing a wager (e.g., inserting money or playing a number of credits on the machine) on one or more of the pay lines. Pay lines on which the player has wagered become active pay lines and any winning combination of symbols appearing on those active pay lines receives an award.

Money/credit detector 16 signals the central processing unit ("CPU") 18 when a wager has been placed, causing the CPU to activate a number of pay lines corresponding to wager amount. In one embodiment, the player selects the number of pay lines (between one and five as shown in FIG. 3) to play by pressing a "Select Lines" key 50 on the video display 12. The player then chooses the number of coins or credits to bet on the selected pay lines by pressing the "Bet Per Line" key 52. After a wager is placed, the reels 30-34 may be set in motion by touching the "Spin Reels" key 54 or, if the player wishes to bet the maximum amount per line, by using the "Max Bet Spin" key 56 on the video display 12.

The CPU 18 uses a random number generator in conjunction with a probability table stored in system memory to select a game outcome (e.g., "base" game outcome) corresponding to a particular set of discrete reel "stop positions." The random number generated is used to look up the corresponding reel stop positions in the probability table. The CPU then causes each reel 30-34 to stop at the appropriate stop position. The discrete symbols 60 graphically illustrate the discrete stop positions and indicate whether the stop positions of the reels represent a winning game outcome. These discrete reel symbols form an array, typically rectangular formed in rows and columns.

A winning base game outcome occurs when the discrete symbols 60 appearing on reels 30-34 along an active pay line correspond to a winning symbol combination contained in the game's pay table. The pay table may be displayed by pushing the pay table button 58 on the video display. The pay table is stored in system memory 22 and lists the awards associated with each possible winning symbol combination.

If the displayed discrete symbols 60 stop in a winning combination, the game credits the player an amount corresponding to the pay table award for that combination multiplied by the credits bet on the winning pay line. A payoff mechanism 24 is operable in response to instructions from the CPU 18 to award a payoff to the player in response to winning outcomes. The payoff may be provided in the form of coins, bills, tickets, coupons, cards, etc., or the credits may be accumulated on the gaming machine. When the player is ready to quit, the accumulated credits may be collected by pressing the "Collect" button 59.

Figure 4:
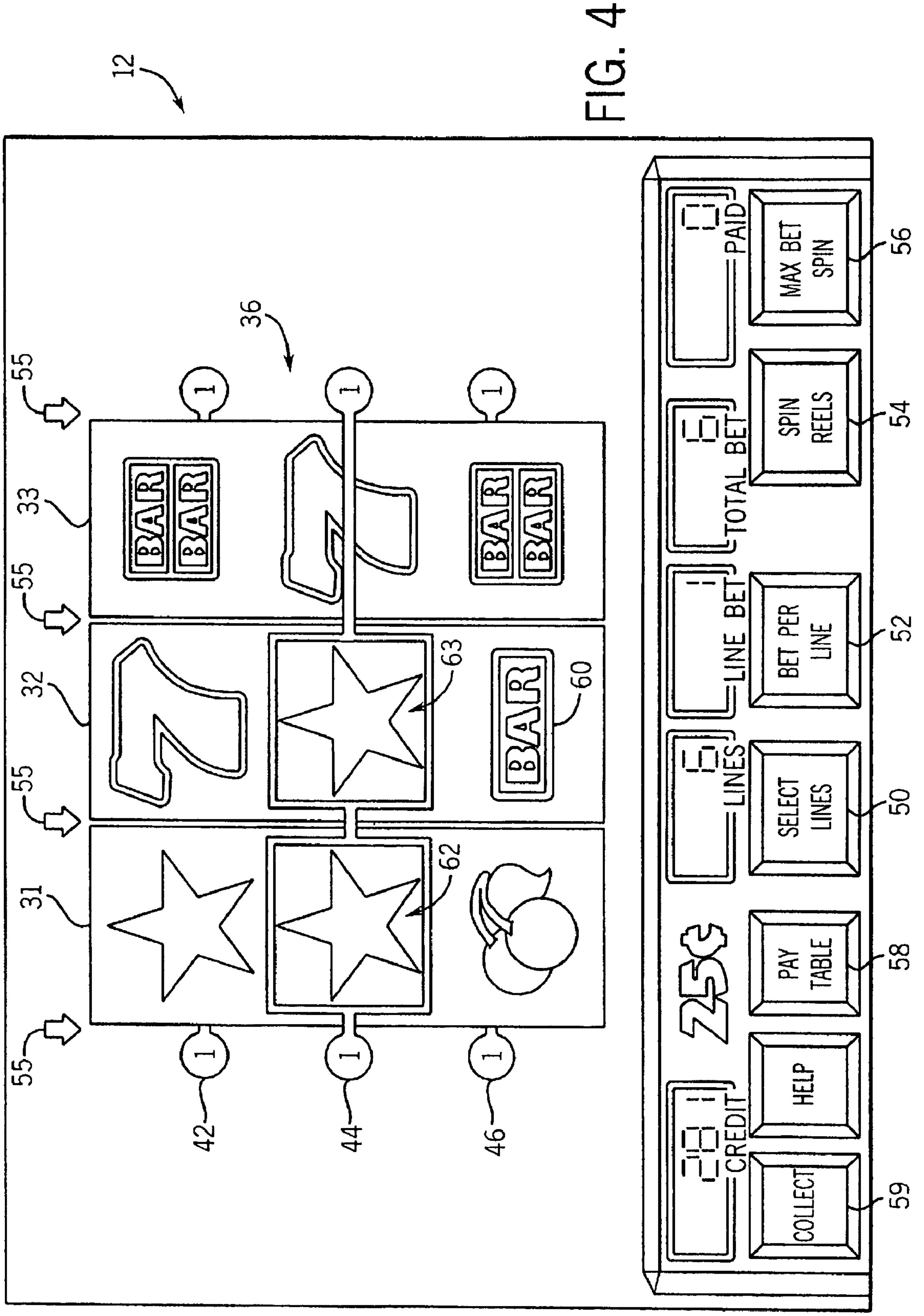
FIG. 4 is a game display from the slot machine of FIG. 1 displaying a three by three base game array.
Figure 5:
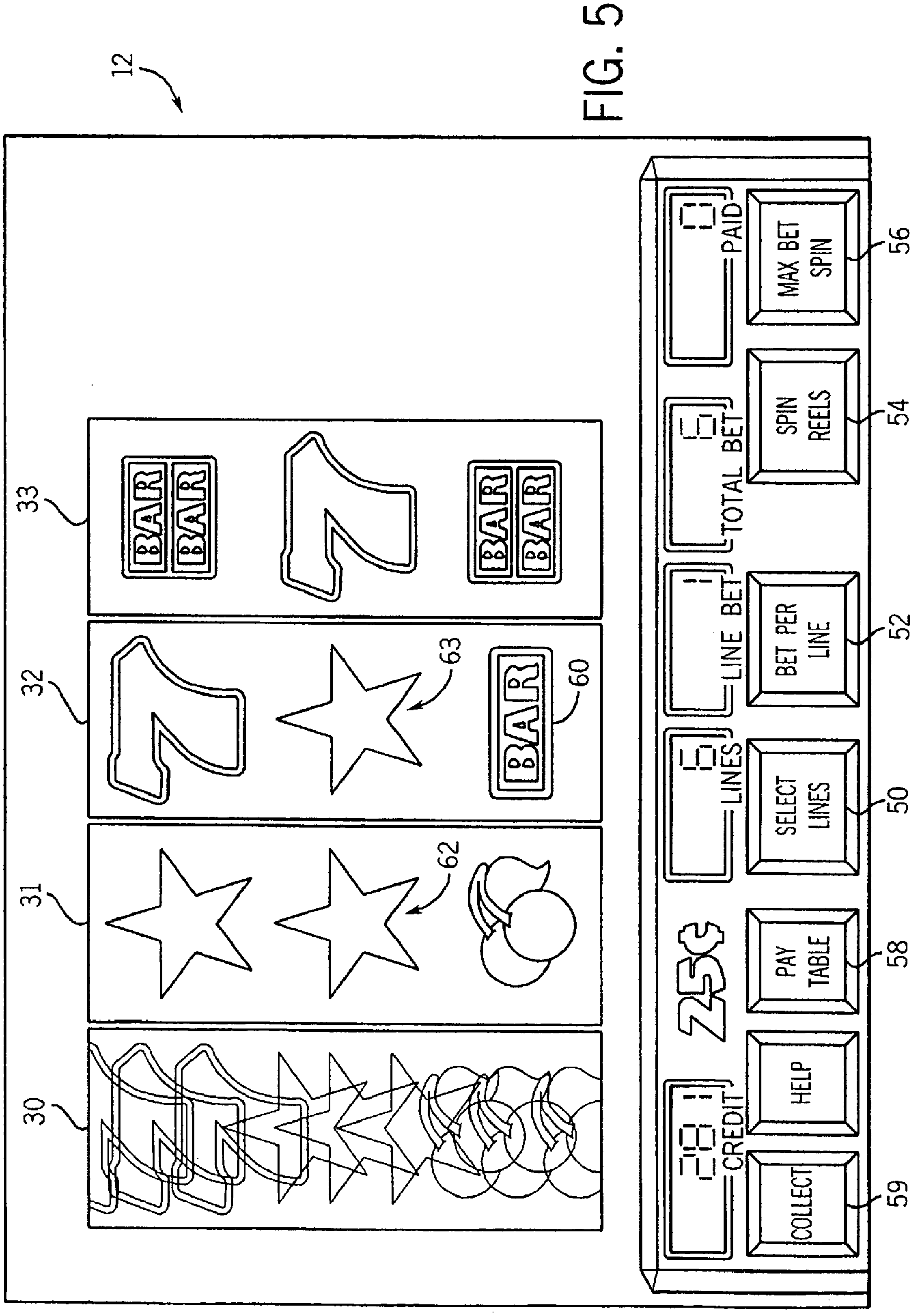
FIG. 5 is the game display of FIG. 4 with the addition of a spinning reel to the left of the base game array of FIG. 4.
Figure 6:
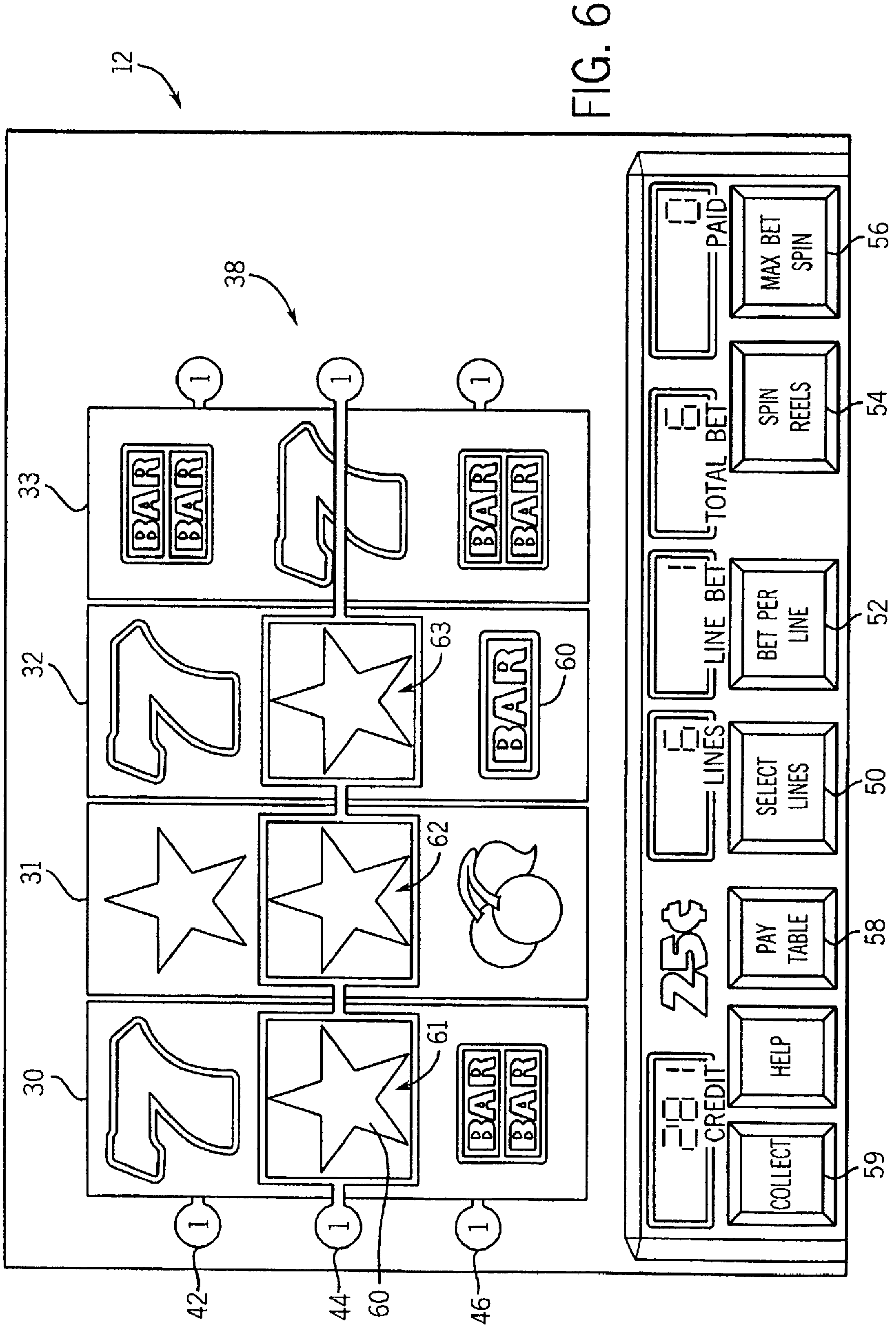
FIG. 6 is the game display of FIG. 5 with the spinning reel stopped to form a secondary array.

The gaming machine described above may give players a bonus feature or a bonus game. The base game produce a base array 36 which is expanded to form a secondary array 38 having additional opportunities to win an award. In one embodiment, an additional reel is added to the base array 36 to form a secondary array 38 as shown in FIG. 4 through FIG. 6. The secondary array 38 created is larger by virtue of the additional reel and provides a new opportunity to create winning symbol combinations. New reels can be added sequentially to provide a number of secondary arrays, each secondary array larger than the last. The base game produces the original or base array 36; the secondary array 38 is any array formed after the original base array 36.

For example, FIG. 4 depicts an initial base game outcome having a three by three base array 36. The base array 36 has three horizontal pay lines 42, 44, 46 running through the top, middle, and lower tier symbols. Pay line 44 is a winning pay line (in this example, any two or more matching symbols are a winning combination on an active pay line). The connecting line extending between the framed winning symbols and extending to the pay line indicia 44 graphically illustrates the winning pay line for the player.

The player now has the opportunity to receive additional reels. The additional reels may have been included in the original wager amount, or an additional wager may be required to receive the reels. Additional reels may be provided one at a time to provide a sequence of progressively larger secondary arrays. Alternately, the maximum number of reels allowed the player might be provided simultaneously.

In one embodiment, a player with the winning outcome as shown in FIG. 4 may feel lucky and wish to receive an additional reel. The player decides to have one additional reel added to the game's three by three base array 36. In one embodiment, the gaming machine 10 may randomly determine where the additional reel is placed. Alternately, in another embodiment, the player may determine where the additional reel is placed—adding an element of strategy to the game. The touch screen 20 of the gaming machine 10 may be used by the player to indicate the position in the array where the additional reel is to be placed. The video display may indicate these positions with a select position indicator 55. The player does not see the outcome of the added reel until after the reel's position has been selected. The reel may be added to the left of the array, to the right of the array, or between any of the reels, that established the base array 36.

As shown in FIG. 5, the additional reel 30 could be positioned to the left of the three by three base array 36 in an attempt to increase the number of matching symbols on the left to right winning pay line in the base game. The added reel

30 is shown spinning—all of the reels from the base array remain in the same outcome position determined for the base game. The added reel 30 is then stopped to give the player a secondary array, or secondary array 38, which carries with it the potential for winning another or an enhanced award. For the game outcome shown in FIG. 6, the player has received an additional matching symbol on pay line 44 because of the additional reel 30.

Figure 7:
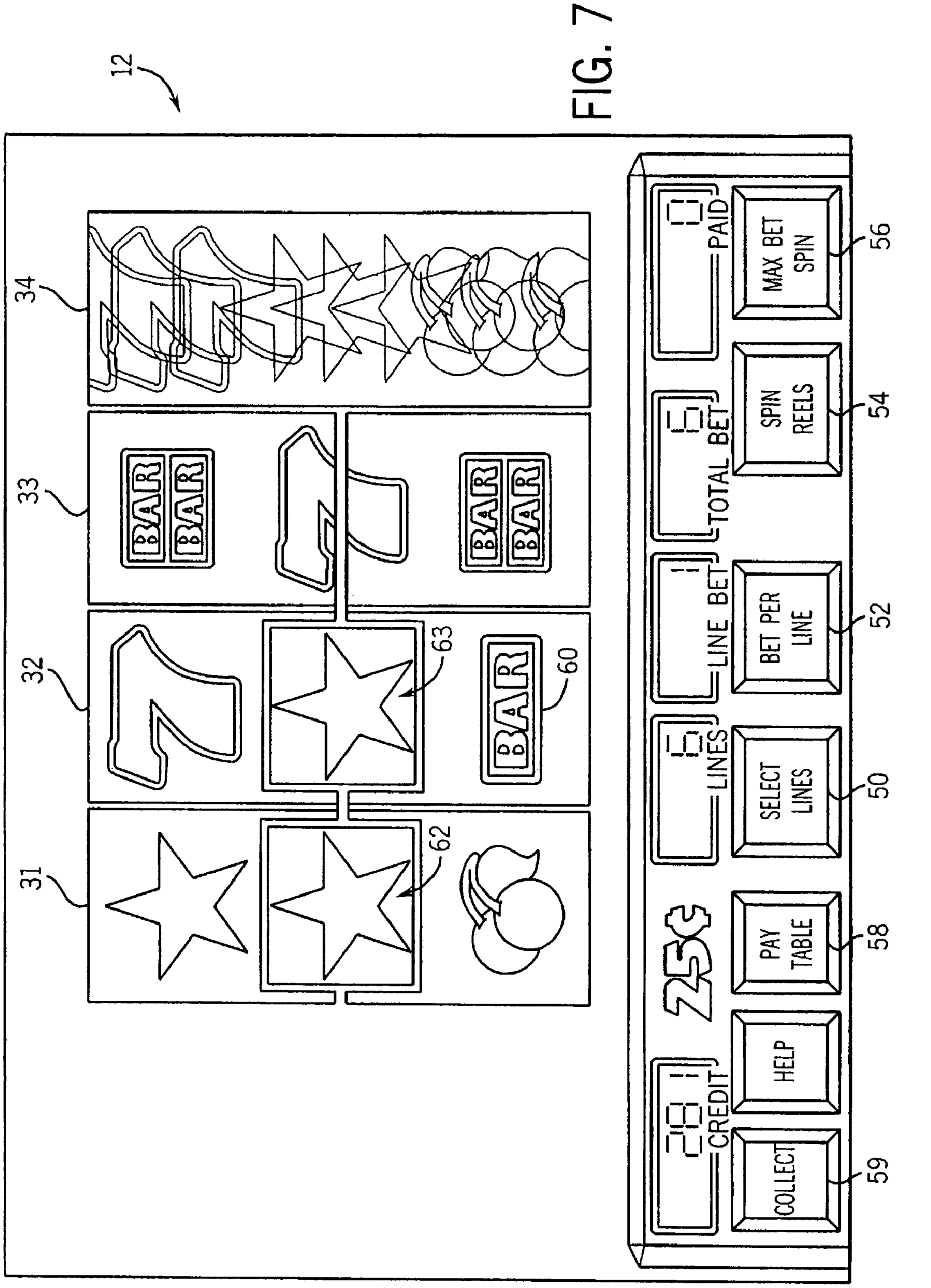
FIG. 7 is the game display of FIG. 4 with the addition of a spinning reel to the right of the base game array of FIG. 4.
Figure 8:
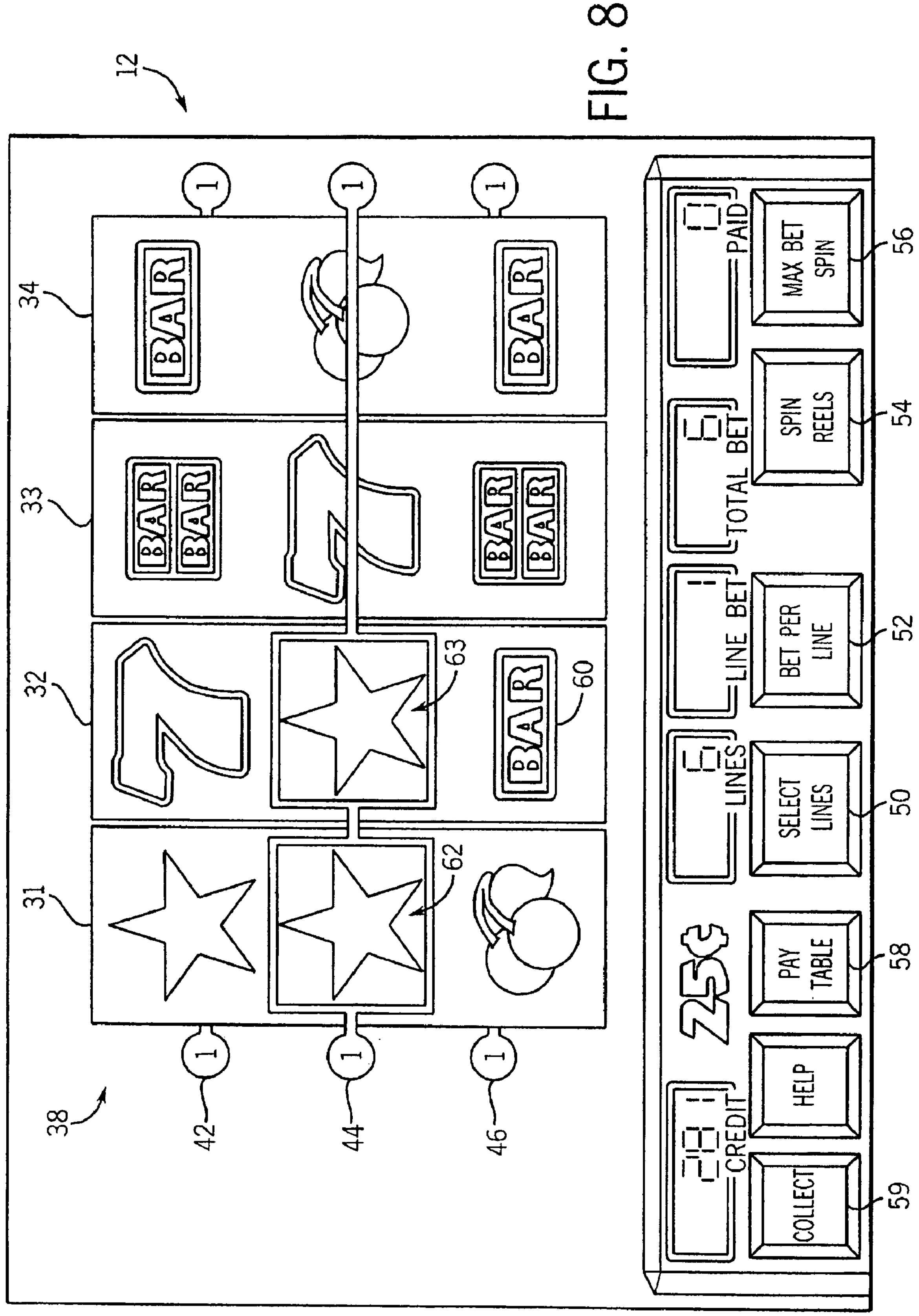
FIG. 8 is the game display of FIG. 7 with the spinning reel stopped to form a secondary array.

Alternately, if the player were trying to satisfy a right-to-left pay, the player can choose an additional reel 34 to be placed to the right of the base three by three base array 36. FIG. 7 displays an additional spinning reel 34 added to the right of the three by three base array 36 of FIG. 4. FIG. 8 shows the secondary array 38 of FIG. 7 in the stopped position displaying the game outcome. In this example, the player has not won an additional award.

Figure 9:
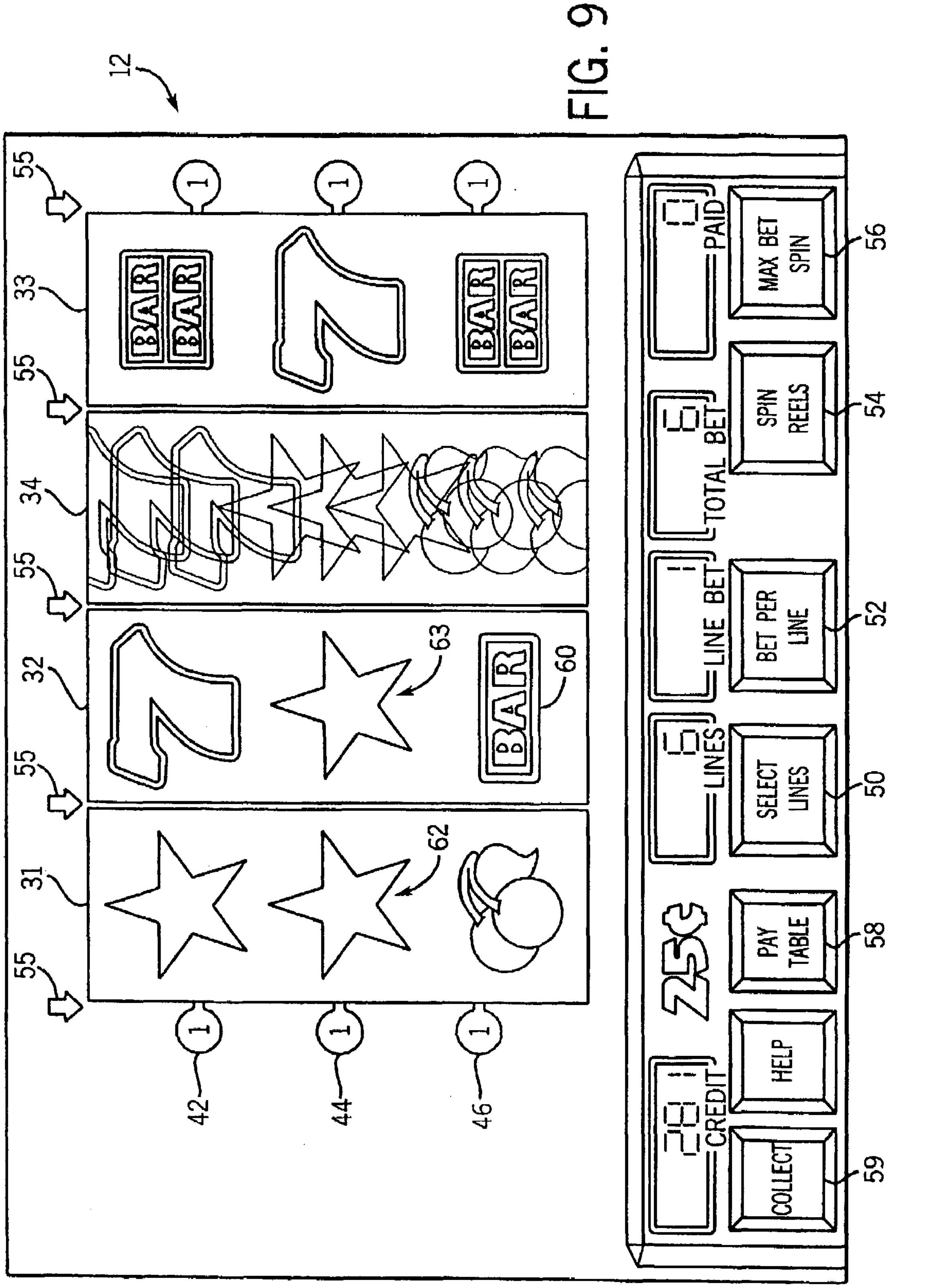
FIG. 9 is the game display of FIG. 4 with the addition of a spinning reel between the reels of the base game array of FIG. 4.
Figure 10:
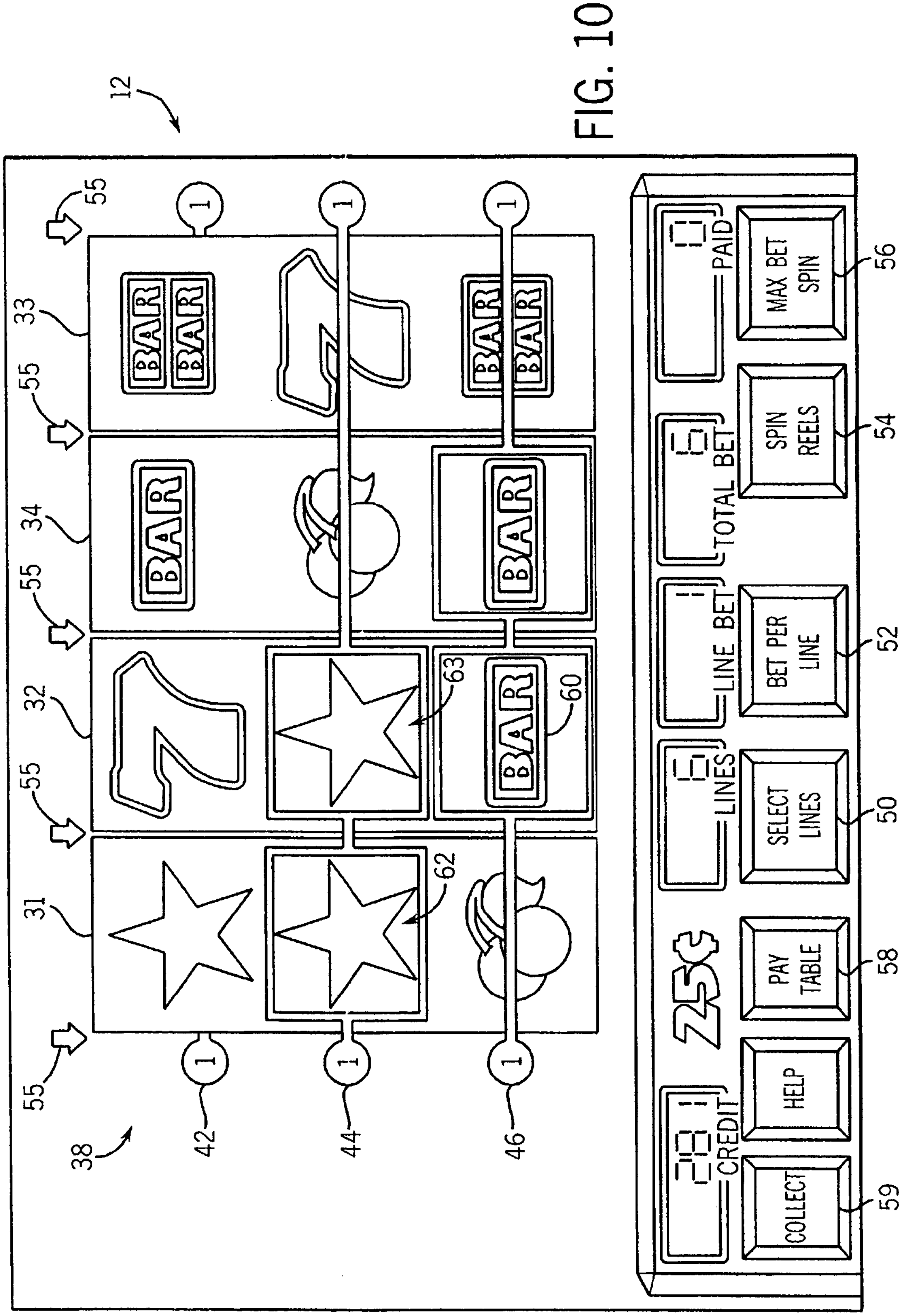
FIG. 10 is the game display of FIG. 9 with the spinning reel stopped to form a secondary array.

Alternately, the player may have selected to place the additional reel between reels 32 and reel 33 of FIG. 4. This is shown in FIG. 9 with the addition of a spinning reel between reels 32 and reel 33. FIG. 10 shows the spinning reel of FIG. 9 stopped and displaying the secondary game outcome on the secondary array 38. In this example, two winning pay lines are shown: the original winning pay line 44 from the base game array and the newly formed winning pay line 46.

Allowing the player to determine where the reel is placed introduces an element of strategy to the game. In the base array 36 shown in FIG. 4, the winning symbols occurring in the first two reels of the three by three base array 36 makes it possible to obtain a three symbol match by adding the additional reel to the left of the three by three array. A player might make this selection if the pay table only reads from left to right. In contrast, the player may choose to add an additional reel to the right of the three by three base array 36 if the pay table reads from right to left as well as left to right. A player may also strategize it is to their advantage to place the added reel between the reels 32 and 33 of the base array 36 with the hope of not only completing pay line 44, which already has two matching symbols, but of also completing a right-to-left pay line.

Although the example provided above discusses only providing one additional reel, it is possible to provide multiple reels to the player. These multiple reels may be provided individually to sequentially step to progressively larger arrays—each subsequent array evaluated for a potentially winning outcome. For example, the player may start with a three by three base array 36 that progressively enlarges into a series of secondary arrays. For example, the three by three base array 36 is first expanded to a three by four secondary array 38, then to a three by five secondary array, and so on until the game is over. The strategy of the game is emphasized when reels are added sequentially to create a series of arrays, each array eligible for an award. This allows players to alter their strategy as the game progresses.

Figure 11:
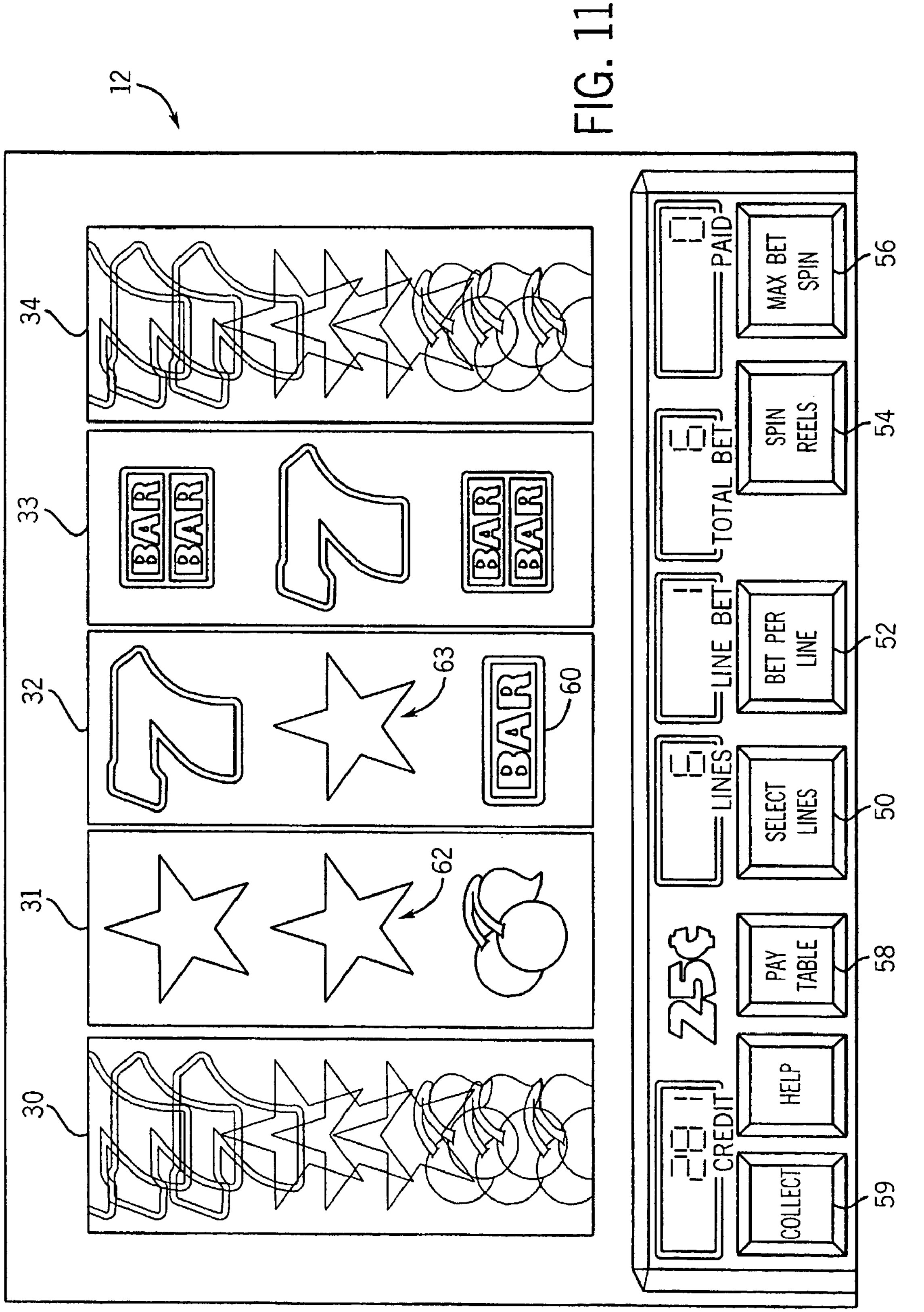
FIG. 11 is the game display of FIG. 4 with the addition of two spinning reels to the base game array of FIG. 4.

Alternatively, all the available additional reels may be simultaneously added to allow a single secondary array 38 to be formed. FIG. 11 shows two additional spinning reels that appear after the three by three base array 36 game outcome of FIG. 4 is displayed. This creates a single secondary array 38 for the game.

Although the additional reels of FIG. 11 appear on either side of the three by three base game array, it is also possible to place both of the additional reels either to the left or to the right of the base game array, between base game reels, or in any other physical configuration preferred.

Figure 12:
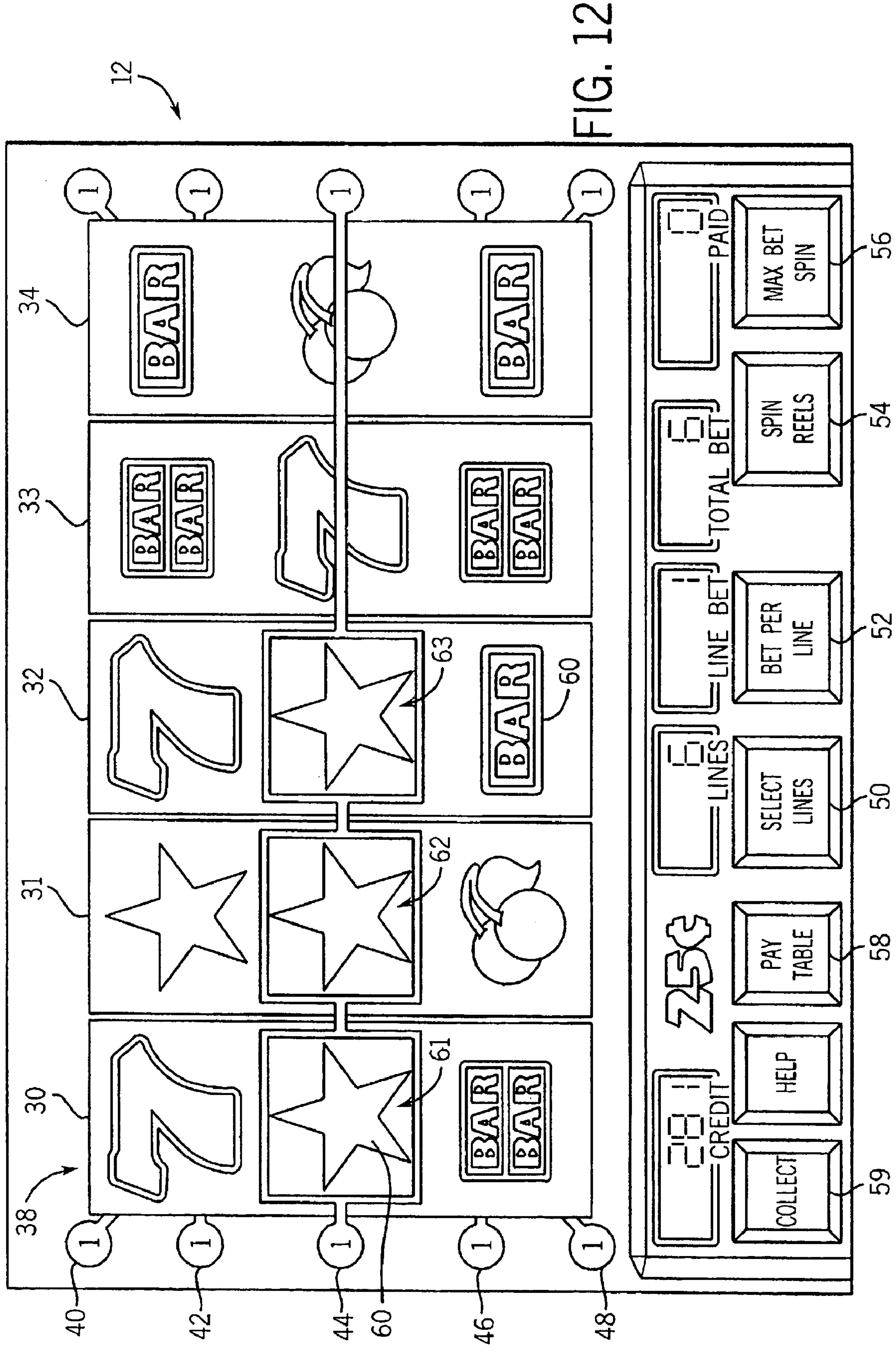
FIG. 12 is the game display of FIG. 11 with the two spinning reels stopped to form a secondary array.

FIG. 12 is the game outcome determined from the array of FIG. 11. Array locations 61, 62, and 63 denote the three winning symbols on winning pay line 44 that are eligible for the corresponding award listed in the pay table. The player could be paid for both the three by three winning array outcome and the three by five winning array outcome. Alternately, the player may only be paid for the highest award won.

In another embodiment, a player may request additional reels at any time during game play for an additional wager. This provides another method for introducing an element of strategy to the game. For example, if the player is unhappy with his initial base game outcome, the player may elect not to receive additional reels. Alternately, if the player has an outstanding three by three base array 36, it may be strategically favorable to purchase additional reels. This strategic decision-making allows players to become more involved with the game and provides a more entertaining gaming experience.

It should be noted that the video display can become quite crowded as a number of additional reels are added to the base game 36. There are a number of different techniques that can be used to clearly display each of the reels and their reel symbols. For example, the reels may be overlaid, i.e. fanned, to maximize display space. Alternately, each of the reel columns may have their width reduced, potentially shaving off part of the displayed symbol to maximize space for additional reels.

In the embodiments described above, the game provides additional reels as part of the initial wager or because of additional wagers made by the player to receive the additional reels. It is also possible that the player is only eligible for additional reels if the base game outcome creates a start-bonus outcome. The start-bonus outcome triggers the player's eligibility to receive additional reels for the secondary event or bonus game. These additional reels may be provided with or without an additional wager.

The start-bonus outcome can be triggered in a number of different ways. For example, a start-bonus outcome may occur when a special start-bonus symbol or a specially designated combination of symbols appears on one or more of the reels. The start-bonus outcome may require the symbol (or combination of discrete symbols) to appear along an active pay line, or may alternatively allow the combination of discrete symbols to appear anywhere on the display. Alternatively, any winning pay line in the basic game may constitute a start-bonus outcome. This winning pay line criterion for a start-bonus outcome is shown in FIG. 4 along winning pay line 44. Once the start-bonus outcome is triggered, the player may then receive additional reels (the start-bonus outcome may determine the number reels added).

The secondary arrays may commence different game play mechanics as the array size increases. For example, an expanded secondary array 38 may have new or additional pay lines to accommodate the new array size. Although the game starts with a three by three matrix with three horizontal pay lines as shown in FIG. 4, it may be desirable to provide additional pay lines with varying geometries such as shown in FIG. 3. These new pay lines may require a new pay and probability table. To accommodate the alteration of the game mechanics, the start-bonus outcome may cause the CPU to shift operation to a pay and probability table specifically associated with the array size displayed.

Although it is customary to pay for each individual pay line, this is not necessary. For example, the initial wager may activate all possible pay lines in each of the subsequent arrays. Alternately, the player's initial wager may only cover the initial array. Each subsequent array formed allows a player to determine the number of pay lines he wishes to activate. Consequently, the player is still paying for additional reels and additional pay lines over the base array 36.

Although all the arrays in the embodiments described above are rectangular, it should be understood that any array shape could be used in conjunction with the invention. For example, a pyramidal array with a base of three symbols, a middle with two symbols and a top with a single symbol may be used as a base array. The secondary array may simply be the addition of four additional discrete symbols to form a new base of the pyramid.

Similarly, it is not necessary to add a reel to the base array 36 to create a secondary array 38; For example, in lieu of adding a reel, a row of symbols can be added to the base array 36. Still another embodiment for increasing the array size includes adding symbols around the border of the base array 36. In short, any method can be used to and symbols to the base array 36 to create a secondary array 38.

In the embodiments described above, the additional reel provides additional symbols that can potentially create new winning combinations. In another embodiment however, the additional reel does not provide additional symbols to create new winning combinations. Rather, the additional reel is a bonus reel 35 that provides a mechanism for producing a potentially enhanced award by applying a bonus symbol 70 to the winning pay line of the base array 36.

Figure 13:
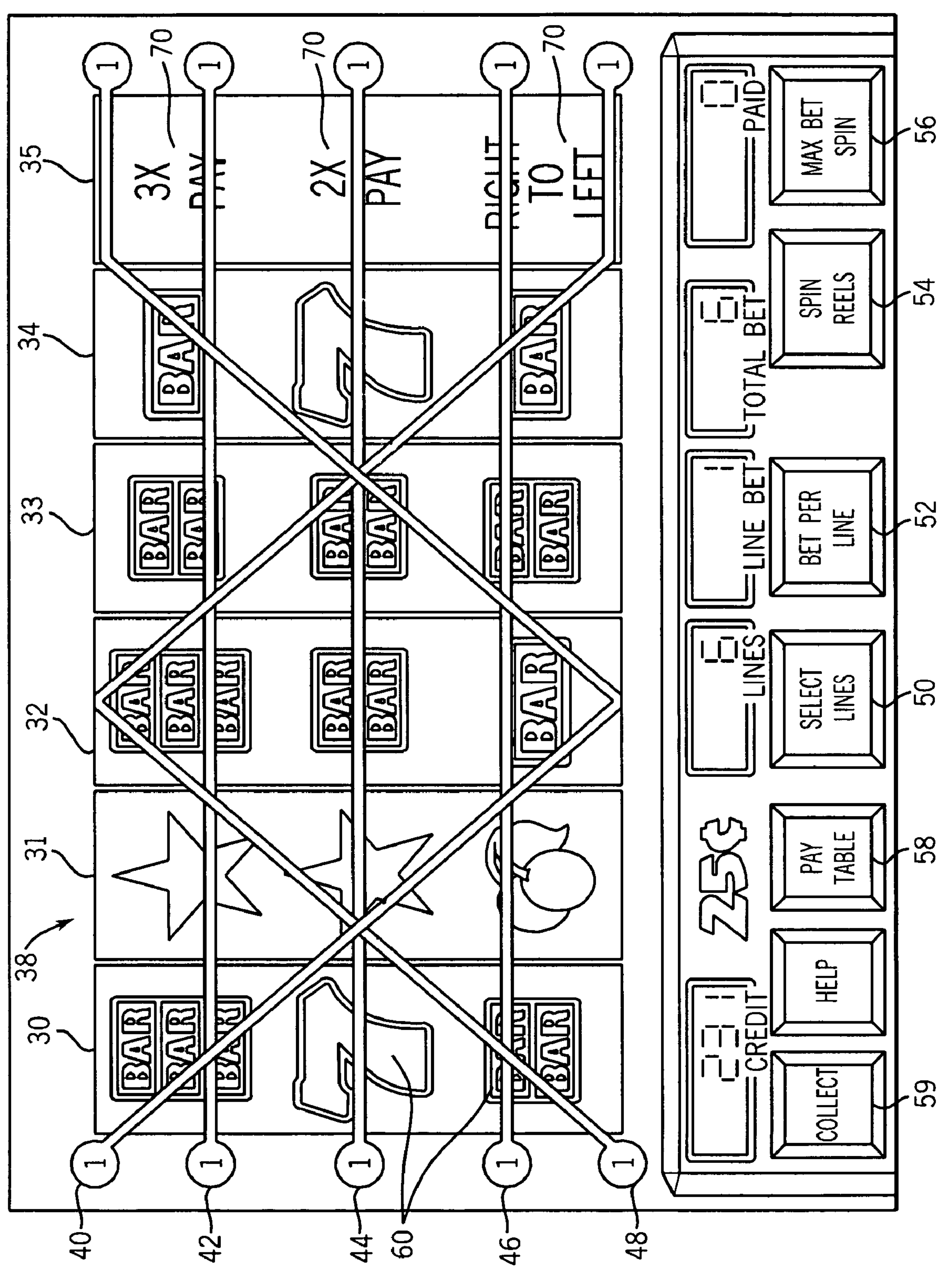
FIG. 13 is a game display from the slot machine of FIG. 1 displaying the available pay lines on a three by five base game array with a bonus reel.

FIG. 13 is a 3 by 5 base game array and a bonus reel 35. FIG. 13 also shows the base game pay lines mapped to the bonus reel 35. A winning combination on any of the base game pay lines is modified by the corresponding bonus reel symbol 70. The bonus reel symbols, or pay line modifier symbols 70, act on the pay line with which they are associated to modify the pay table award.

Any pay line configuration may be utilized to indicate the bonus reel's 35 relation to each individual pay line. The bonus reel 35 and its relation to each of the pay lines can be clearly presented by simply extending the end of the pay line horizontally through the adjacent bonus reel symbol 70 as shown in FIG. 13. Consequently, pay lines 40 and 42 extend through the top tier in the sixth reel, pay line 44 extends through the middle tier of the sixth reel, and pay lines 46 and 48 extend through the bottom tier of the sixth reel. If preferred, however, the bonus reel can be placed anywhere in the array. For example, the bonus reel could be placed between any of the original base game reels 31-34.

Figure 14:
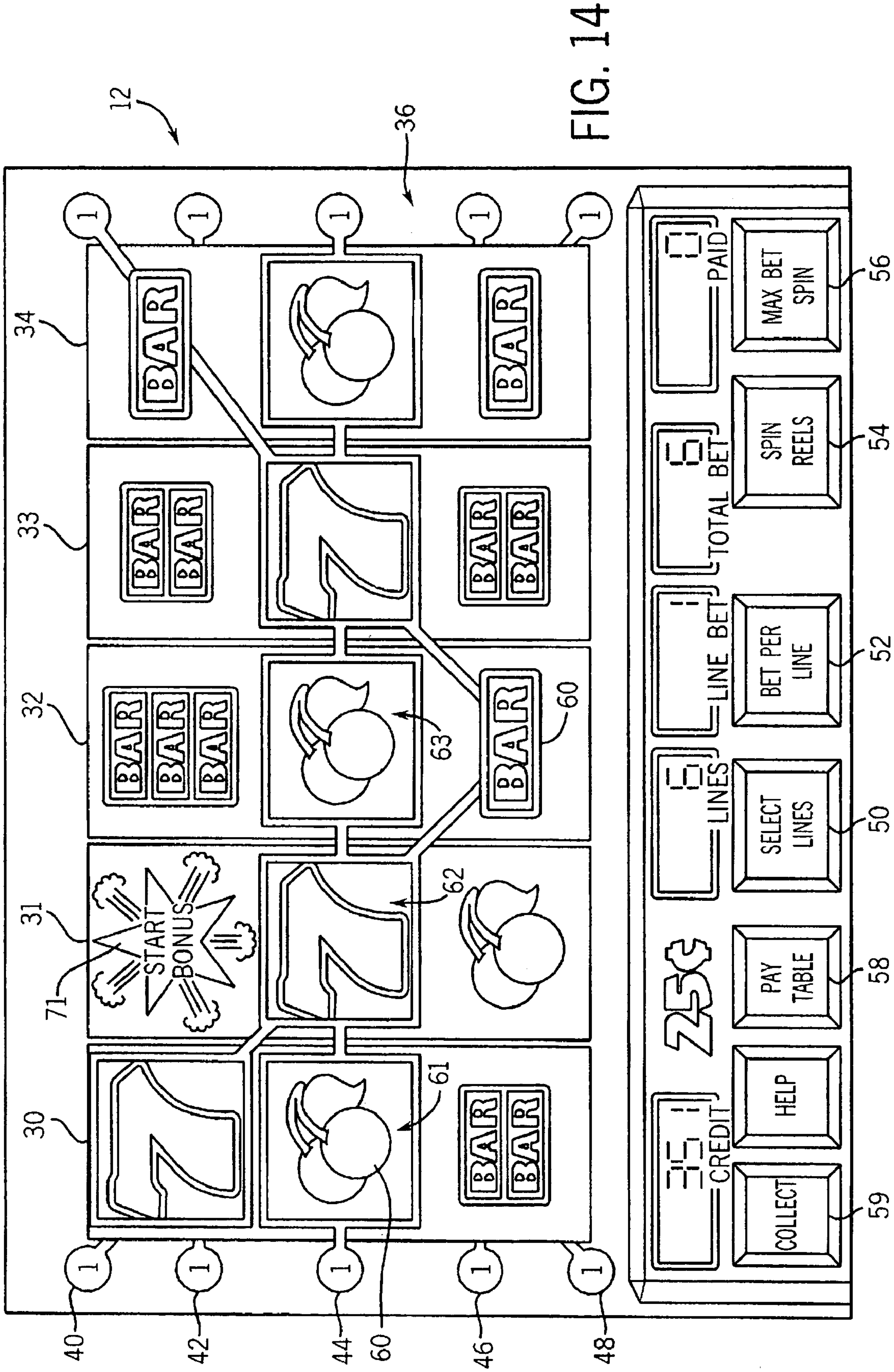
FIG. 14 is a three by five base game array with two winning pay lines and a start-bonus outcome.

To demonstrate the operation of the bonus reel embodiment, we turn to FIG. 14, which depicts the initial outcome of a three by five base array 36. As discussed above, a start-bonus outcome may be defined in any number of ways. For example, a start-bonus outcome in the base array 36 may require a winning pay line. If preferred, in addition to the winning pay lines, a start-bonus reel symbol 71 may be required either on the pay lines or anywhere on the array to trigger the bonus reel 35. This allows the game to be played without automatically triggering the bonus reel 35 every time a pay line is won.

Figure 15:
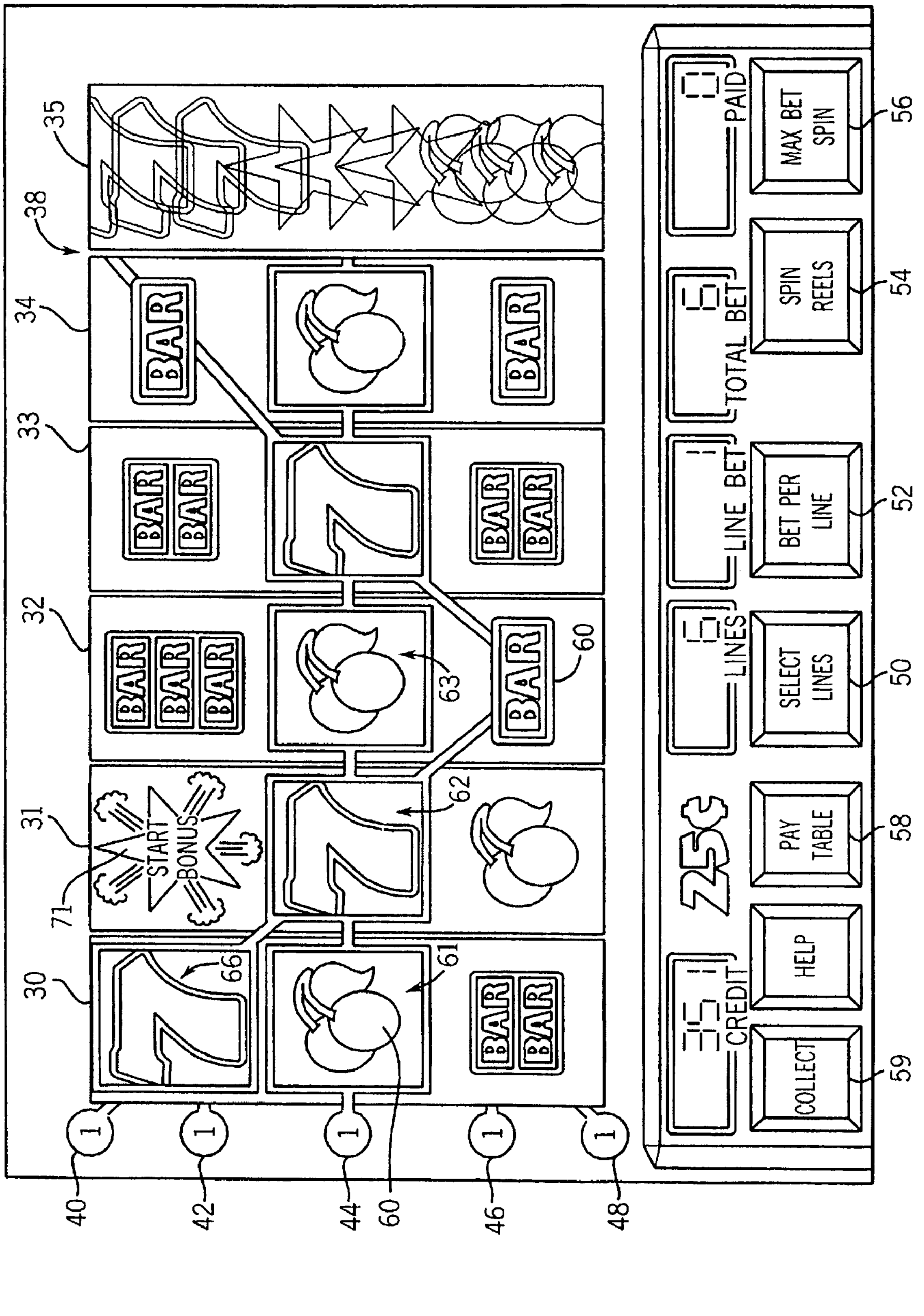
FIG. 15 is the game display of FIG. 14 with a spinning bonus reel added to the three by five base game array.

In FIG. 14, a start-bonus outcome has occurred in the base array 36 by virtue of the start-bonus symbol 71 in array position as well as the occurrence of winning pay lines 40 and 44. The winning symbols along pay line 44 are three cherry symbols. The winning symbols along pay line 40 include the three 7's. Consequently, the start-bonus outcome is triggered, causing the addition of the spinning bonus reel 35 to the base array 36 as shown in FIG. 15.

Figure 16:
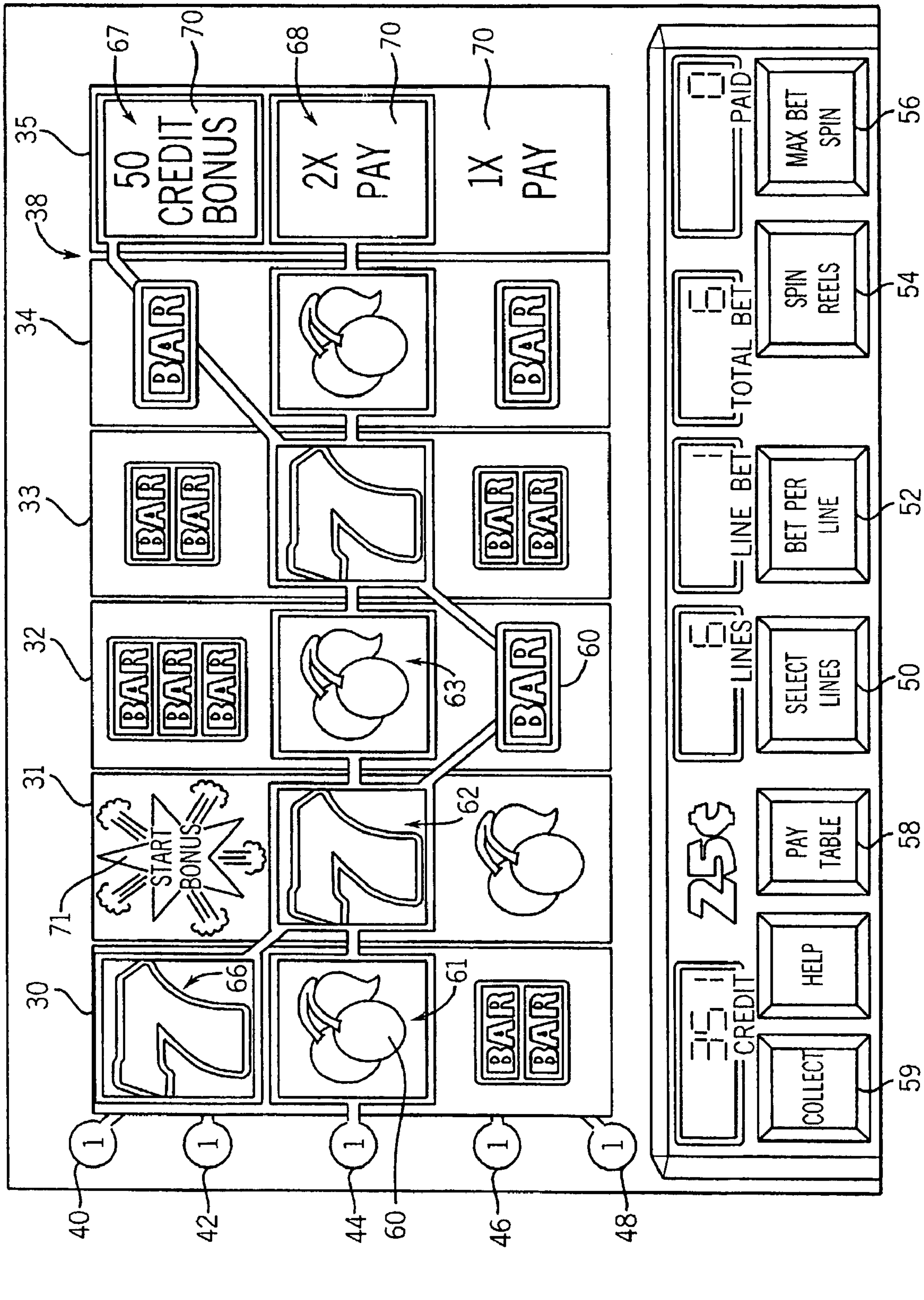
FIG. 16 is the game display of FIG. 15 with the bonus reel stopped.

FIG. 16 displays the final game outcome. The total award offered the player varies with the bonus award indicated by the winning pay line applied to the award earned by that winning pay line in the three by five base game array per the pay table. For example, in FIG. 16, the bonus reel 35 has been added and stopped to display the game outcome. Here, the two winning pay lines are eligible for the bonus amounts as directed by the pay line to the corresponding bonus reel symbol. Winning pay line 40 extends to the fifty-credit bonus reel symbol in array position 67. The 50 credit bonus is added to the base game award for pay line 40. Winning pay line 44 extends to the two times multiplier bonus reel in array position 68. This bonus reel symbol indicates that the base game array award for that pay line is doubled.

In another embodiment, the bonus reel may be generated by an additional wager that is placed before the base game outcome and which automatically entitles the player to receive the bonus reel. If the base game array does not produce a winning pay line, however, the bonus reel has no effect.

Although the embodiments shown for the bonus reel have only discussed enhancing the pay line award, it is also possible that the bonus reel outcome does not affect any of the winning pay lines, i.e., a null bonus symbol. Additionally, rather than enhancing the award, the bonus reel may have outcomes that diminish the winning outcome.

Another possibility is that the bonus reel may contain modifier symbols that alter the game rules, or the symbols present in the base game array to create winning combinations not otherwise present in the original base game array. For example, if the game only pays for winning combinations that occur from left to right, one bonus reel symbol may be to allow a right to left pay for those pay lines that intersect that particular bonus reel symbol position.

Alternately, the bonus reel may contain wild symbols or other special features that change the associated pay line symbols of the base array to form a modified array and potentially new winning symbol combinations. For example, a bonus reel symbol may state that sevens are wild. This allows any seven on that pay line to change to a winning symbol. Again, as noted above, the bonus reel does not become part of a new array that creates new winning symbol combinations based on the overall array. The bonus reel only affects the way the original array is interpreted: by virtue of the award offered (by changing the original symbols in the base array) or modifying the award associated with the winning symbol combination in the base array.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of conducting a wagering game on a gaming machine, comprising:

making a first wager to initiate play of the wagering game;

randomly selecting a first plurality of symbols to form a first array; each of the first plurality of symbols positioned in a column and row in the first array;

displaying the first array;

determining if the first array has a first winning outcome;

making a second wager to be eligible for an award based on a second array;

randomly selecting a second plurality of symbols;

adding the second plurality of symbols between at least some of the first plurality of symbols in the first array to form the second array, the second array including the second plurality of symbols and the first plurality of symbols in the first array without replacing any of the first plurality of symbols, each of the first plurality of symbols remaining in either the respective column or row in the first array;

displaying the second array;

determining if the second array has a second winning outcome; and awarding an award for any winning outcome.

2. A method of conducting a wagering game as described in claim 1, wherein the second array is the first array with an additional column, the additional column formed by the second plurality of symbols.

3. A method of conducting a wagering game as described in claim 1, wherein the second array is the first array with an additional row, the additional row formed from the second plurality of symbols.

4. A method of conducting a wagering game as described in claim 1, wherein the second array is the first array with an additional row and an additional column, the second plurality of symbols forming the additional row and additional column.

5. A method of conducting a wagering game as described in claim 1, further including making a second wager to receive the second array.

6. A method of conducting a wagering game as described in claim 1, further including receiving a start-bonus outcome in the first array to receive the second array.

7. A method of conducting a wagering game as described in claim 1, further including using a first pay table to determine the award for the first winning outcome and a second pay table to determine the award for the second winning outcome.

8. A method of conducting a wagering game as described in claim 1, further including using a first probability table to randomly determine the first plurality of symbols and a second probability table to determine the second plurality of symbols.

9. A method of conducting a wagering game as described in claim 1, further including a first set of pay lines associated with the first array and a second set of pay lines associated with the second array.

10. A method of conducting a wagering game as described in claim 1, further including receiving a first winning outcome in the first array to receive the second array.

11. The method of conducting a wagering game as described in claim 1 wherein the second plurality of symbols includes a plurality of modifier symbols; and wherein the determining if the second array has second winning outcome includes associating a winning pay line with one of the plurality of modifier symbols intersected by the winning pay line; and modifying the value of the winning pay line with the modifier symbol associated with the winning pay line to determine the second winning outcome.

12. A method of conducting a wagering game as described in claim 2, wherein the player selects the position of the additional column added to the first array.

13. A method of conducting a wagering game as described in claim 2, wherein the position of the additional column added to the first away is determined randomly.

14. A method of conducting a wagering game as described in claim 3, wherein the player selects the position of the additional row added to the first array.

15. A method of conducting a wagering game as described in claim 3, wherein the position of the additional row is determined randomly.

16. A method of conducting a wagering game as described in claim 11, wherein the modifier symbol represents a mathematical function applied to the determined value.

17. A method of conducting a wagering game as described in claim 11, further including receiving a start-bonus outcome in the first away to add the modifier symbols to the first away to form the second array.

18. A method of conducting a wagering game on a gaming machine, comprising:

making a first wager to initiate play of the wagering game;

randomly selecting a first plurality of symbols to form a first array;

displaying the first array;

determining if the first array has a first winning pay line;

making a second wager to be eligible for an award based on a second array;

randomly selecting a second plurality of symbols;

adding the second plurality of symbols between at least some of the first plurality of symbols in the first away to form the second array, the second away including the second plurality of symbols and the first plurality of symbols in the first away without replacing any of the first plurality of symbols;

displaying the second array;

determining if the second away has a second winning pay line; and awarding a player for any winning pay line.

19. A method of conducting a wagering game as described in claim 18, wherein the second away is the first away with an additional column, the additional column formed from the second plurality of symbols.

20. A method of conducting a wagering game as described in claim 18, wherein the second away is the first away with an additional row, the additional row formed from the second plurality of symbols.

21. A method of conducting a wagering game as described in claim 18, wherein the second away has an additional row of symbols and an additional column of symbols added to the first array.

22. A method of conducting a wagering game as described in claim 18, further including making a second wager to display the second array.

23. A method of conducting a wagering game as described in claim 18, further including receiving a start-bonus outcome in the first away to display the second array.

24. A method conducting a wagering game as described in claim 18, further including using a first pay table to determine the award for the first winning pay line and using a second pay table to determine the award for the second winning pay line.

25. A method of conducting a wagering game as described in claim 18, further including using a first probability table to randomly determine the first plurality of symbols and a second probability table to randomly determine a second plurality of symbols.

26. A method of conducting a wagering game as described in claim 18, further including a first set of pay lines associated with the first array and a different second set of pay lines associated with the second array.

27. A method of conducting a wagering game as described in claim 18, further including receiving a first winning pay line in the first array to display the second array.

28. A method of conducting a wagering game as described in claim 19, wherein the player selects the position of the additional column added to the first array.

29. A method of conducting a wagering game as described in claim 19, wherein the position of the additional column is determined randomly.

30. A method of conducting a wagering game as described in claim 20, wherein the player selects the position of the additional row added to the first array.

31. A method of conducting a wagering game as described in claim 20, wherein the position of the additional row added to the first away is determined randomly.

32. A method of conducting a wagering game on a gaming machine, comprising:

making a first wager to initiate play of the wagering game;

randomly selecting a first plurality of symbols to form a first array;

displaying the first array;

determining if the first array has a first winning outcome;

making a second wager to be eligible for an award based on a second array;

randomly selecting a second plurality of symbols;

adding the second plurality of symbols to the first away between at least some of the first plurality of symbols in the first away to form the second array, the second away including the second plurality of symbols and the first plurality of symbols in the first array without replacing any of the first plurality of symbols;

displaying the second array;

determining if the second away has a second winning outcome;

randomly selecting a third plurality of symbols;

adding the third plurality of symbols to the second array to form a third array;

displaying the third array;

determining if the third away has a third winning outcome; and awarding an award for any winning outcome.

33. A method of conducting a wagering game on a gaming machine, comprising:

making a first wager to initiate play of the wagering game;

randomly selecting a first plurality of symbols to form a first array;

displaying the first array;

determining if the first array has a first winning pay line;

making a second wager to be eligible for an award based on a second array;

randomly selecting a second plurality of symbols;

adding the second plurality of symbols to the first away between at least some of the first plurality of symbols in the first away to form the second array, the second away including the second plurality of symbols and the first plurality of symbols in the first array without replacing any of the first plurality of symbols;

displaying the second array;

determining if the second away has a second winning pay line;

randomly selecting a third plurality of symbols;

adding the third plurality of symbols to the second array to form a third array;

displaying the third array;

determining if the third away has a third winning pay line; and awarding a player for any winning pay line.

34. A method of conducting a wagering game on a gaming machine, comprising:

making a wager to initiate play of the wagering game;

randomly selecting a first plurality of symbols to form a first array;

displaying the first array;

making a second wager to be eligible for an award based on a second array;

randomly selecting a second plurality of symbols;

adding the second plurality of symbols to the first away between at least some of the first plurality of symbols in the first away to form the second array, the second away including the second plurality of symbols and the first plurality of symbols in the first array without replacing any of the first plurality of symbols;

displaying the second array; and making an award for any winning outcome.

35. A method of conducting a wagering game on a gaming machine, comprising:

providing an initial array of symbol positions for accommodating respective symbols;

offering a player an option to make a wager on an expanded array; and in response to the wager, expanding the array to form the expanded array, the expanded array including additional symbol positions between at least some of the respective symbols in the initial away for accommodating respective additional symbols, the expanded array including the additional symbol positions and the initial symbol positions in the initial array without replacing any of the initial away of symbol positions.

* * * * *

UNITED STATES PATENT AND TRADEMARK OFFICE

CERTIFICATE OF CORRECTION

PATENT NO. : 7,654,895 B2
APPLICATION NO. : 10/759619
DATED : February 2, 2010
INVENTOR(S) : Larry J. Pacey It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1069 days.

Signed and Sealed this

Twenty-third Day of November, 2010

David J. Kappos

*Director of the United States Patent and Trademark Office*

UNITED STATES PATENT AND TRADEMARK OFFICE

CERTIFICATE OF CORRECTION

PATENT NO. : 7,654,895 B2
APPLICATION NO. : 10/759619
DATED : February 2, 2010
INVENTOR(S) : Larry J. Pacey It is certified that error appears in the above-identified patent and that said Letters Patent is hereby corrected as shown below:

- Claim 13, Column 9, Line 61
  Replace “away” to “array”
- Claim 18, Column 10, Line 19
  Replace “away” to “array”
- Claim 18, Column 10, Line 20
  Replace “away” to “array”
- Claim 18, Column 10, Line 22
  Replace “away” to “array”
- Claim 19, Column 10, Line 29
  Replace “away” to “array”
- Claim 20, Column 10, Line 33
  Replace “away” to “array”
- Claim 21, Column 10, Line 19
  Replace “away” to “array”
- Claim 23, Column 10, Line 45
  Replace “away” to “array”
- Claim 32, Column 11, Line 17
  Replace “away” to “array”
- Claim 32, Column 11, Line 19
  Replace “the first away to form second” to “the first array to form second”
- Claim 32, Column 11, Line 19
  Replace “the second away” to “the second array”

Signed and Sealed this
Twenty-eighth Day of June, 2011

David J. Kappos
*Director of the United States Patent and Trademark Office*